（12） United States Patent
Li et al.

(10) Patent No.: US 7,234,580 B2
(45) Date of Patent: Jun. 26, 2007

(54) METHOD FOR OPTIMIZING GROOVE STRUCTURE OF FRICTION PLATE OF WET TYPE FRICTION ENGAGEMENT APPARATUS

(75) Inventors: Chen Yu Li, Tomakomai (JP); Jin Takahashi, Nagoya (JP)

(73) Assignee: Dynax Corporation, Chitose-shi (JP)

( * ) Notice: Subject to any disclaimer, the term of this patent is extended or adjusted under 35 U.S.C. 154(b) by 237 days.

(21) Appl. No.: 11/062,107

(22) Filed: Feb. 18, 2005

(65) Prior Publication Data

US 2005/0224310 A1    Oct. 13, 2005

(30) Foreign Application Priority Data

Feb. 18, 2004    (JP)    .............................. 2004-041208

(51) Int. Cl.
*F16D 13/72*    (2006.01)
*F16D 13/74*    (2006.01)

(52) U.S. Cl. ................. 192/70.12; 192/113.36
(58) Field of Classification Search .................... None
See application file for complete search history.

(56) References Cited

U.S. PATENT DOCUMENTS 6,601,684 B2 *    8/2003    Collis et al. ............ 192/107 R

FOREIGN PATENT DOCUMENTS

JP    9-53674    2/1997

* cited by examiner

*Primary Examiner*—Saul Rodriguez
(74) *Attorney, Agent, or Firm*—Howson & Howson LLP

(57) ABSTRACT

The object of the present invention is to provide an optimizing method for a groove structure of a friction disk of a wet-type friction engaging element, which can reduce drag torque by increasing outgoing flow of lubricating oil on the friction surface and increasing the content of air in the lubricating oil. The optimizing method for a groove structure of a friction disk of a wet-type friction engagement element comprising a sectoral inner section 12 of a groove 10 widening inwardly formed on the surface of a friction member of the wet-type friction engaging element, wherein the outgoing flow per groove area is calculated based on the entrance angle (opening angle) θ of the inner section 12 and the ratio h/w of the full length w of the groove 10 to the length h of the inner section; and then a range of the entrance angle (opening angle) θ of the inner section and the ratio h/w of the full length w of the groove to the length h of the inner section is determined where the outgoing flow per groove area is at least a certain value.

2 Claims, 7 Drawing Sheets

FIG. 4

| design factor of nozzle groove | | | | | |
|---|---|---|---|---|---|
| | | entrance angle of groove θ deg | | | |
| | | 15 | 30 | 45 | 60 |
| nozzle position h/w | 0.1 | ratio of groove area 20.13% | 20.28% | 20.44% | 20.63% |
| | 0.2 | ratio of groove area 19.33% | 19.95% | 20.60% | 21.34% |
| | 0.3 | ratio of groove area 18.97% | 20.35% | 21.83% | 23.51% |
| | 0.4 | ratio of groove area 19.05% | 21.50% | 24.14% | 27.13% |
| | 0.5 | ratio of groove area 19.57% | 23.39% | 27.54% | 32.22% |

METHOD FOR OPTIMIZING GROOVE STRUCTURE OF FRICTION PLATE OF WET TYPE FRICTION ENGAGEMENT APPARATUS

TECHNICAL FIELD OF THE INVENTION

The present invention belongs to the technical field of a groove structure of a clutch of a wet-type friction engagement apparatus or a wet-type friction brake etc., used in a transmission for motor vehicles or in a transmission for industrial or construction machines.

BACKGROUND ART

Conventionally, a wet-type friction engaging element has been used for example in an automatic transmission for motor vehicles.

As the wet-type friction engaging element of the automatic transmission, there have been used a friction plate, a brake band, etc. in a multiple disk friction engagement apparatus. As shown in FIG. 10, a multiple disk friction engagement apparatus 20 conventionally comprises a hydraulic-actuated piston 21, and a plurality of wet-type friction plates 22 and mating plates 23 arranged alternately so as to be engaged with each other by the piston 21.

The wet-type friction disk 22 comprises a core plate 24 and friction members 25, 25 fixedly attached on both sides of the core plate 24.

As shown in FIG. 11, on the surface 26 of the friction member 25 which is in contact with the mating plate 23, a plurality of grooves 30, of which sides are in parallel, are radially formed (e. g., Unexamined Patent Publication No. 53674/1997).

These grooves are for draining lubricating oil supplied for cooling, and when the wet-type friction disks with the friction members 25 fixedly attached thereon are rotated relative to the mating plates in the non-engaging state of the wet-type friction disk, the lubricating oil supplied from the center is dragged and drained towards the outer circumference.

Theoretically, torque is not transmitted between the wet-type friction disk 22 and the mating plate 23 when they are in non-engaging state. However, since there is lubricating oil between the wet-type friction disk 22 and the mating plate 23, in reality, torque is transmitted to some degree from the wet-type friction disk 22 to the mating plate 23, or from the mating plate 23 to the wet-type friction disk 22. Such torque is called a drag torque, and this may cause a loss of motive power in an automatic transmission.

This drag torque is caused by shear resistance of lubricating oil. It is known that shear resistance decreases in case lubricating oil on the friction side contains much air, but on the other hand, shear resistance increases when lubricating oil on the friction side contains little air. In addition, air content in lubricating oil on the friction surface can be increased by increasing outgoing flow of lubricating oil. Therefore, in order to reduce drag torque of the wet-type friction disk 22 and the mating plate 23, which are rotated relatively, it is effective to increase outgoing flow of lubricating oil on the friction surface, increase the content of air in lubricating oil, and thus to reduce shear resistance of lubricating oil.

SUMMARY OF THE INVENTION

The object of the present invention is to provide an optimizing method for a groove structure of a wet-type friction engaging element, which can reduce drag torque by increasing outgoing flow of lubricating oil on the friction surface, and by increasing the content of air in the lubricating oil.

This invention solved the above-mentioned problems by providing an optimizing method for a groove structure of a friction disk of a wet-type friction engaging element, specifically for a groove structure comprising a sectoral inner section widening inwardly formed on the surface of the friction disk of a wet-type friction engaging element, wherein the outgoing flow per groove area is calculated based on the entrance angle (opening angle) θ of the inner section and the ratio h/w of the full length w of the groove to the length h of the inner section; and then a range for said entrance angle (opening angle) θ of the inner section and the ratio h/w of the full length w of the groove to the length h of the inner section where said outgoing flow per groove area is at least a certain value is determined.

BRIEF DESCRIPTION OF DRAWINGS

FIG. 4 is an diagram showing the shape of a groove and the rate of groove area, when entrance angle (opening angle) of the inner section and the ratio of the full length of a groove to the length of the inner section are variously changed.

DETAILED DESCRIPTIONS OF PREFERRED EMBODIMENTS

An optimizing method for a groove structure of a friction disk of a wet-type friction engaging element according to the present invention will be explained, referring to FIG. 1.

An optimizing method for a groove structure of a friction disk of a wet-type friction engaging element according to the present invention is an optimizing method specifically for a groove structure comprising grooves 10 having a sectoral inner section 12 widening inwardly formed on the surface of the friction disk of the wet-type friction engaging element; wherein the outgoing flow per groove area is calculated based on the entrance angle (opening angle) θ of the inner section and the ratio h/w of the full length w of the groove to the length h of the inner section; and then a range for said entrance angle (opening angle) θ of the inner section and said ratio h/w of the full length w of the groove to the length h of the inner section where said outgoing flow per groove area is at least a certain value is determined.

Figure 1A:
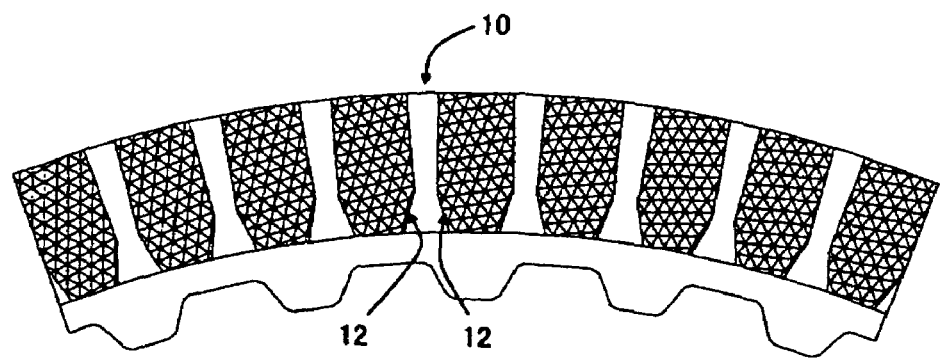
FIG. 1 is a schematic view showing a groove structure of a friction disk of a wet-type friction engaging element according to the present invention.
Figure 1B:
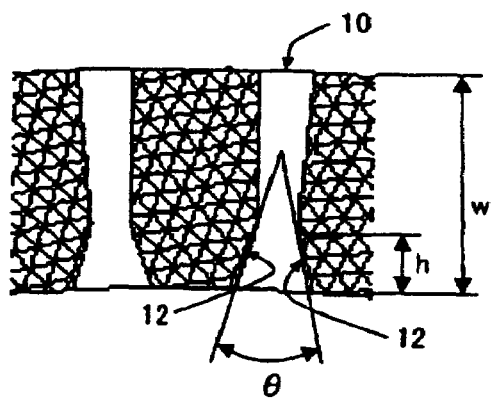

Although a groove 10 on the outer circumferential side is slightly widening by an angle of 5 degrees in FIG. 1, its shape is not limited to this, and the sides of the groove 10 on the outer circumferential side may be in parallel as of the prior art. In this connection, the outgoing flow increases in case the widening angle on the outer circumferential side is large; however, this is not preferable since an area occupied by the friction member is reduced simultaneously.

Therefore, the widening angle on the outer circumferential side is appropriately determined in the range above 0 degree to the maximum angle where the required area of the friction member can be secured.

Figure 2:
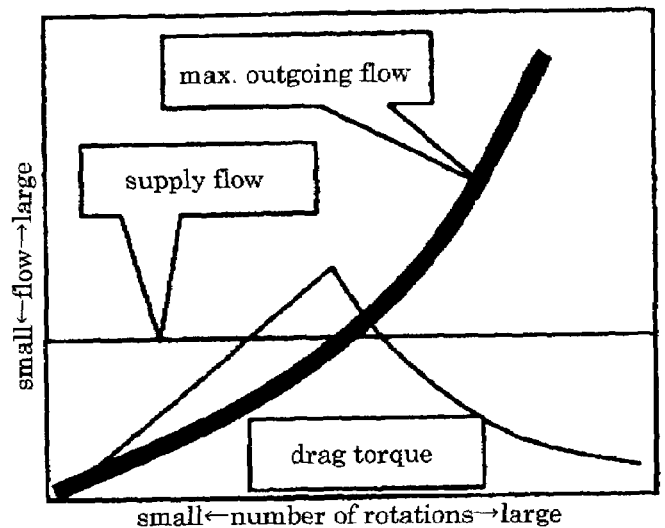
FIG. 2 is a graph showing a relation between the number of rotations of a wet-type friction disk, maximum outgoing flow of lubricating oil and drag torque, where supply flow of lubricating oil is constant.

FIG. 2 shows a relation between the number of rotations a supply wet-type friction disk, maximum outgoing flow of lubricating oil and drag torque, where the outgoing flow of lubricating oil is constant. Here, the maximum outgoing flow of lubricating oil means the maximum outgoing flow of the disk, which is obtained from the theoretically-calculated value of the outgoing flow, which is not influenced by the actual supply flow.

Accordingly, it can be seen that drag torque reaches its maximum when the supply flow and maximum outgoing flow are equal.

As a result of experimenting and measuring outgoing flow of lubricating oil at the point where said drag torque reaches its maximum with grooves of the friction disk being changed to various forms, it is discovered by the inventors that it has a significant effect for improving outgoing flow when the inner section of the groove is widening inwardly.

In addition, it is necessary to improve not only mere outgoing flow of the friction disk but also outgoing flow per groove area. This is due to the consideration that heat-resistance is required for the friction disk and thus area of a groove should be kept as small as possible.

Consequently, the present invention can obtain an ideal groove structure of the friction member by calculating outgoing flow per groove based on the entrance angle (opening angle) θ of the inner section and the ratio h/w of the full length w of the groove to the length h of the inner section; and then determining a range for said entrance angle (opening angle) θ of the inner section and said ratio h/w of the full length w of the groove to the length h of the inner section where the outgoing flow per groove area is at least a certain value. According to the present invention, the groove structure, which can increase outgoing flow of lubricating oil on the friction surface without losing heat resistance property, increase the content of air in lubricating oil, and reduce drag torque, can be easily obtained.

Concretely, a software for three-dimensional heat-flow analysis "SCRYU/Tetra for Windows (provided by Software Cradle Co., Ltd.)" was used for calculation.

Giving consideration to the volume of calculations required, a model was set to be one segment applying periodical boundary and comprising a groove. Lubricating oil for analysis was assumed to be in a steady state. Analytic region was divided into a stationary region and a rotation region, wherein the section comprising a groove was a rotation region, and the mating flat section was a stationary region. In this calculation, a finite volume method was used for discretization method; and k-ε model was used for a turbulent flow model.

Figure 3:
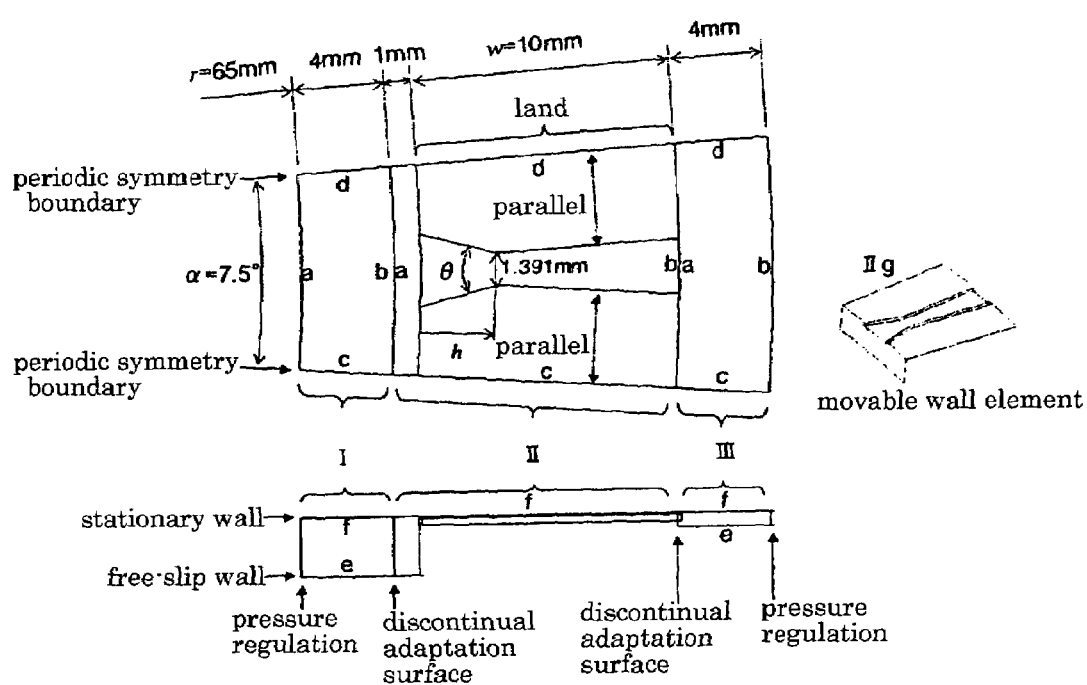
FIG. 3 is an explanatory representation of the computation method of flow.

In addition, the outgoing flow per groove area of the friction disk of which inner diameter is 140 mm and outer diameter is 160 mm was examined, using the models shown in FIGS. 3 and 4, while the number of rotations of the wet-type friction disk is set as 500 rpm, and entrance angle (opening angle) of the inner section and the ratio of the full length of the groove to the length of the inner section were variously changed.

Figure 5:
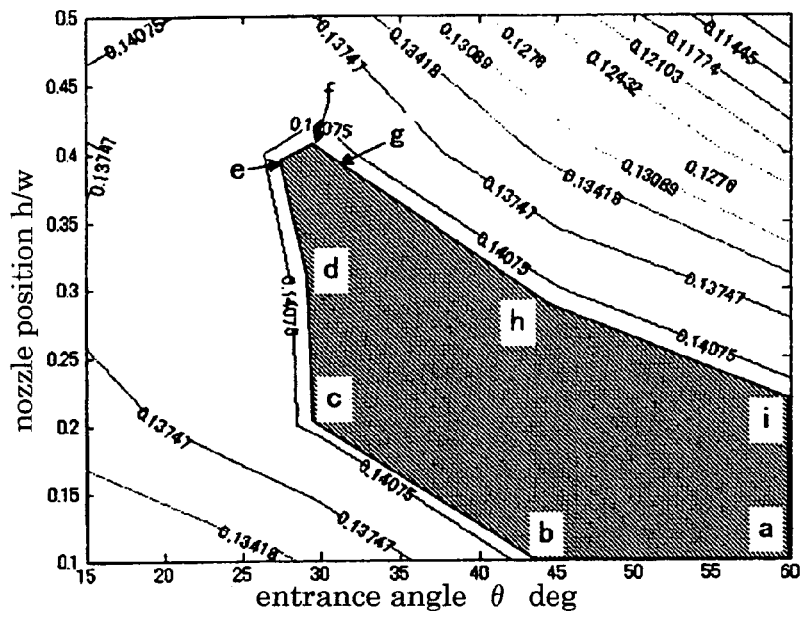
FIG. 5 is a graph showing outgoing flow of the friction member with inner diameter of 140 mm and outer diameter of 160 mm, in case the entrance angle (opening angle) and the ratio of the full length of a groove to the length of the inner section are variously changed.

The result is shown in FIG. 5. In FIG. 5, the horizontal axis is the entrance angle (opening angle) θ of the inner section 12; the vertical axis is the ratio h/w of the full length w of the groove 10 to the length h of the inner section 12; and the outgoing flow per groove area is shown with the contour lines.

In this connection, the range of calculation shown in FIG. 5 was limited to the horizontal axis of 15-60 degrees and the vertical axis of 0.1-0.5, in view of the actual specifications of friction disks as well as the possibility of manufacturing.

From FIG. 5, it can be seen that relatively large outgoing flow per groove area of above 0.14075 cc/min/mm² is obtained in the region covered with diagonal lines. Concretely, it can be seen that a relatively large outgoing flow per groove area of at least 0.14075 cc/min/mm² can be obtained when the entrance angle (opening angle) θ of the inner secion and the ratio of the full length w of the groove to the length h of said inner section are within the region defined by joining point a (60.0, 0), point b (43.4, 0), point c (28.3, 0.20), point d (27.9, 0.3), point e (26.3, 0.40), point f (30.0, 0.42), point g (32.0, 0.4), point h (45.0, 0.30) and point i (60.0, 0.23) with line segments on the Cartesian coordinates (including the line segments themselves).

Subsequently, the outgoing flow per groove area of the friction disk, of which inner diameter is 178 mm and outer diameter is 200 mm, was examined, using the same method as described above.

Figure 6:
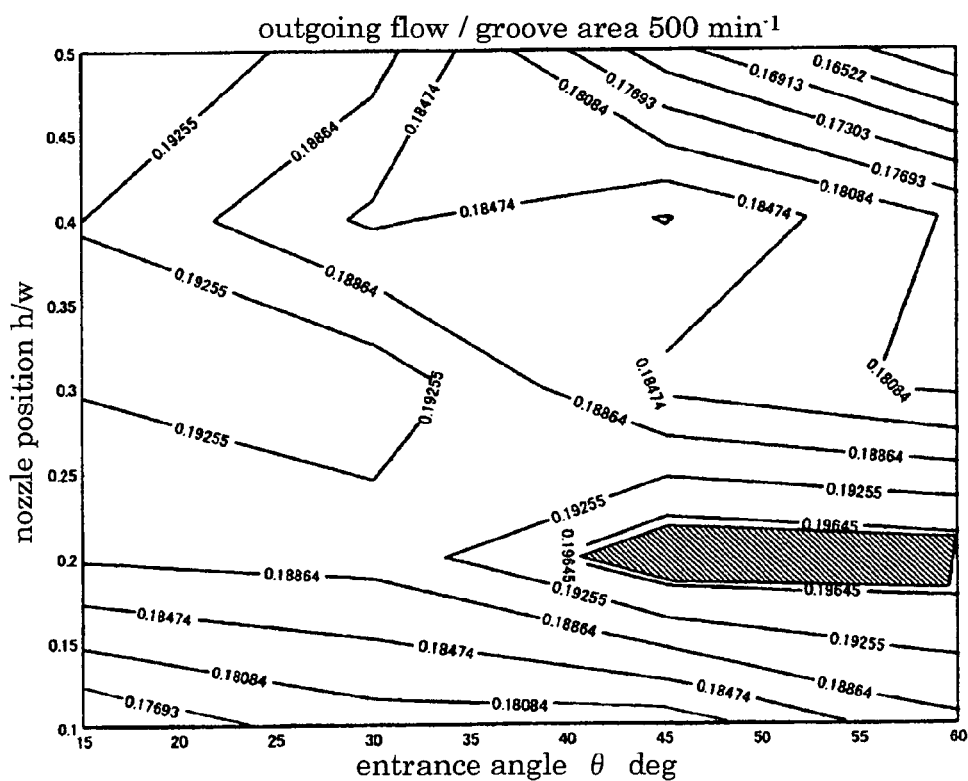
FIG. 6 is a graph showing outgoing flow of the friction member with inner diameter of 178 mm and outer diameter of 200 mm, in case the entrance angle (opening angle) of the inner section and the ratio of the full length of a groove to the length of the inner section are variously changed.

The result is shown in FIG. 6. From FIG. 6, it can be seen that relatively large outgoing flow per groove square of at least 0.19645 cc/min/mm² can be obtained in the region covered with diagonal lines.

Furthermore, the outgoing flow per groove area of the friction member of which inner diameter is 78 mm and outer diameter is 100 mm, was examined, using the same method as described above.

Figure 7:
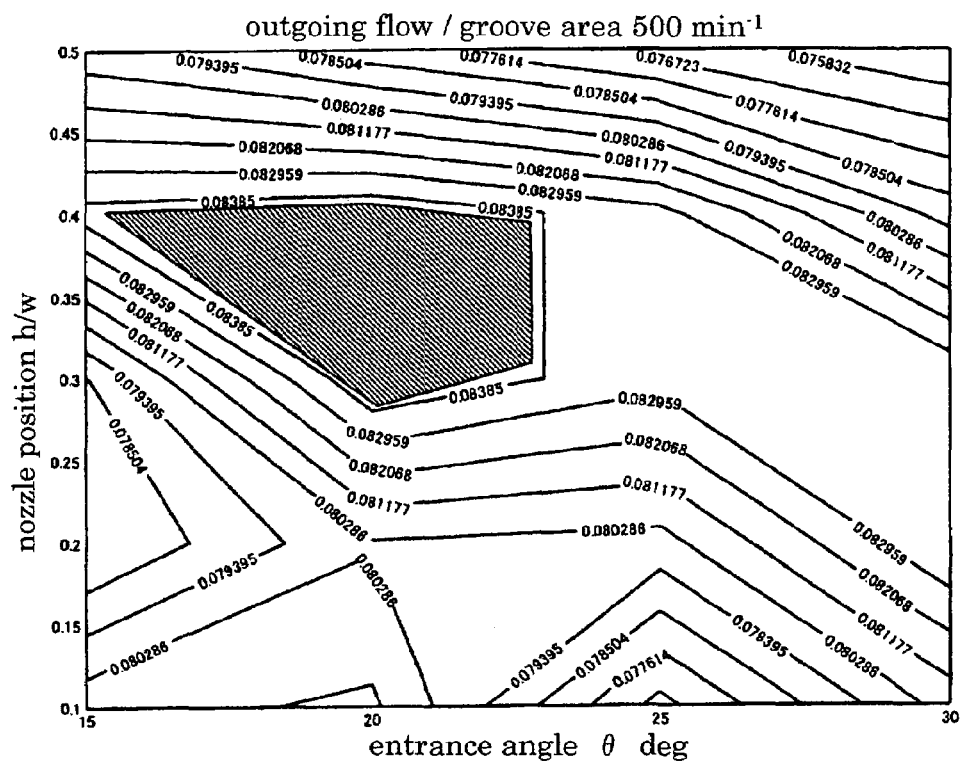
FIG. 7 is a graph showing outgoing flow of the friction member with inner diameter of 78 mm and outer diameter of 100 mm, in case the entrance angle (opening angle) of the inner section and the ratio of the full length of a groove to the length of the inner section are variously changed.

The result is shown in FIG. 7. From FIG. 7, it can be seen that relatively large outgoing flow per groove area of at least 0.08385 cc/min/mm² can be obtained in the region covered with diagonal lines.

Figure 8:
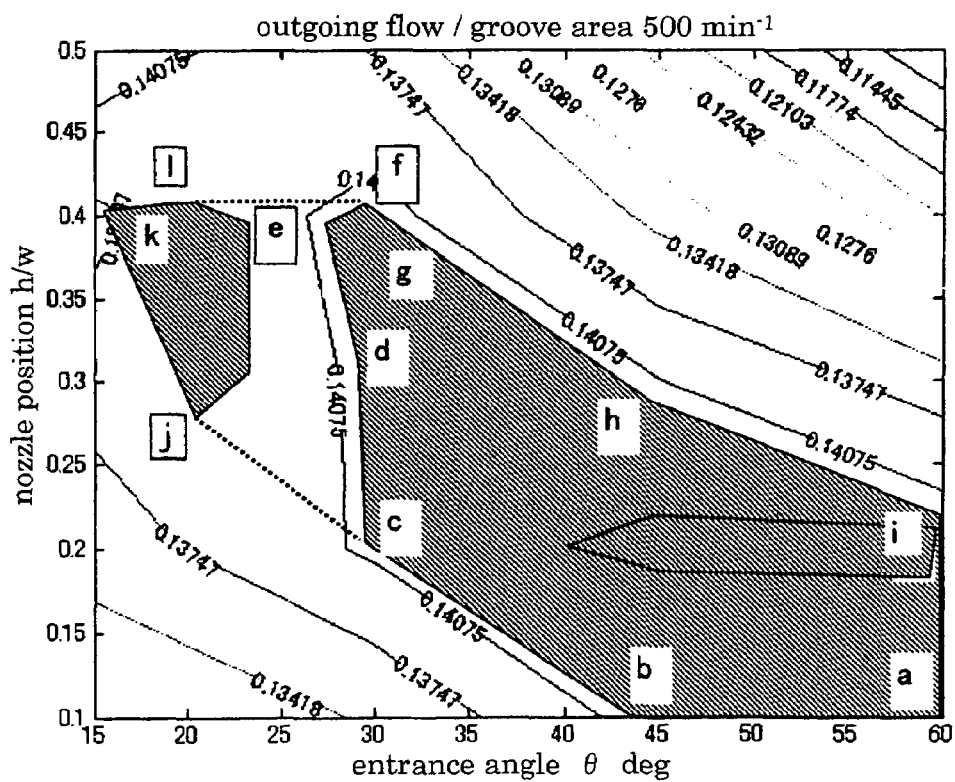
FIG. 8 is a graph combining the results from the calculations of FIGS. 5-7.

FIG. 8 shows a graph combining all the results from the calculations of FIGS. 5-7. From FIG. 8, it can be seen that in case the outer dimension of the friction disk is between 100 mm-200 mm, a relatively large outgoing flow per groove area can be obtained when the entrance angle (opening angle) θ and the ratio h/w of the full length w of the groove to the length h of the inner section are within the region defined by joining point a (60.0, 0), point b (43.4, 0), point c (28.3, 0.20), point i (20.5, 0.28), point k (15.5, 0.40), point l (20.0, 0.41), point f (30.0, 0.42), point h (45.0, 0.30) and point i (60.0, 0.23) with the line segments on Cartesian coordinates (including the section surrounded by the dotted line fl, dotted line cj, solid line cf and solid line jl), in comparison with the outside of said region. When shown in a rough square, it can be said that the entrance angle (opening angle) θ is in the range of 15-60 degrees, and the ratio h/w of the full length w of a groove to the length h of the inner section is in the range of 0.1-0.4.

Consequently, according to the present invention, the groove structure, having relatively large outgoing flow per groove area, can be obtained comparatively easily.

An example and a comparative example of the present invention will be explained below.

EXAMPLE

An example of the present invention is a friction disk with inner diameter of 140 mm and outer diameter of 160 mm, wherein an inner section of the groove widens inwardly of the friction disk, and the groove is formed with the entrance angle (opening angle) θ of 30 degrees and the ratio h/w of the full length w of the groove to the length h of the inner section of 0.3, using the optimizing method according to the present invention.

COMPARATIVE EXAMPLE

Figure 11:
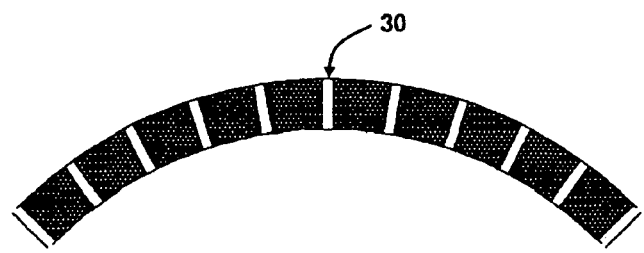
FIG. 11 is a schematic view showing a conventional groove structure of a friction disk of a wet-type friction engaging element.

A comparative example has the same structure as the example including the number of grooves and depth of grooves, except the structure wherein both sides of a groove are in parallel to one another as shown in FIG. 11.

Drag torque of the example and the comparative example were examined with various numbers of rotations.

Figure 9:
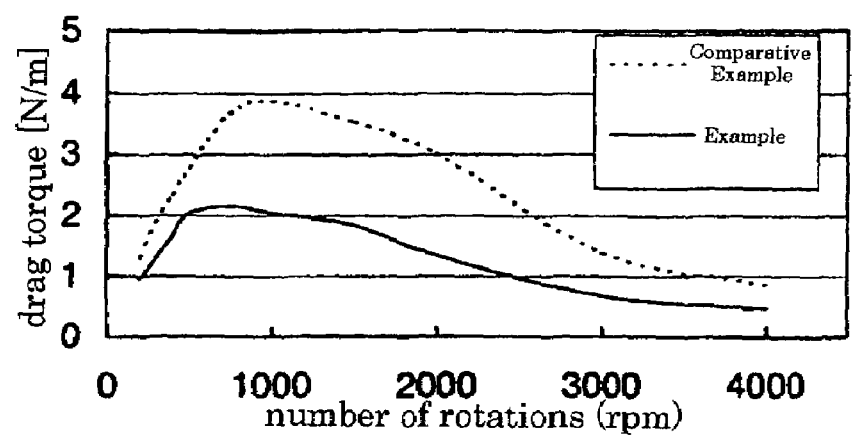
FIG. 9 is a graph showing drag torque of an example and a comparative example, with varied rotation numbers.
Figure 10:
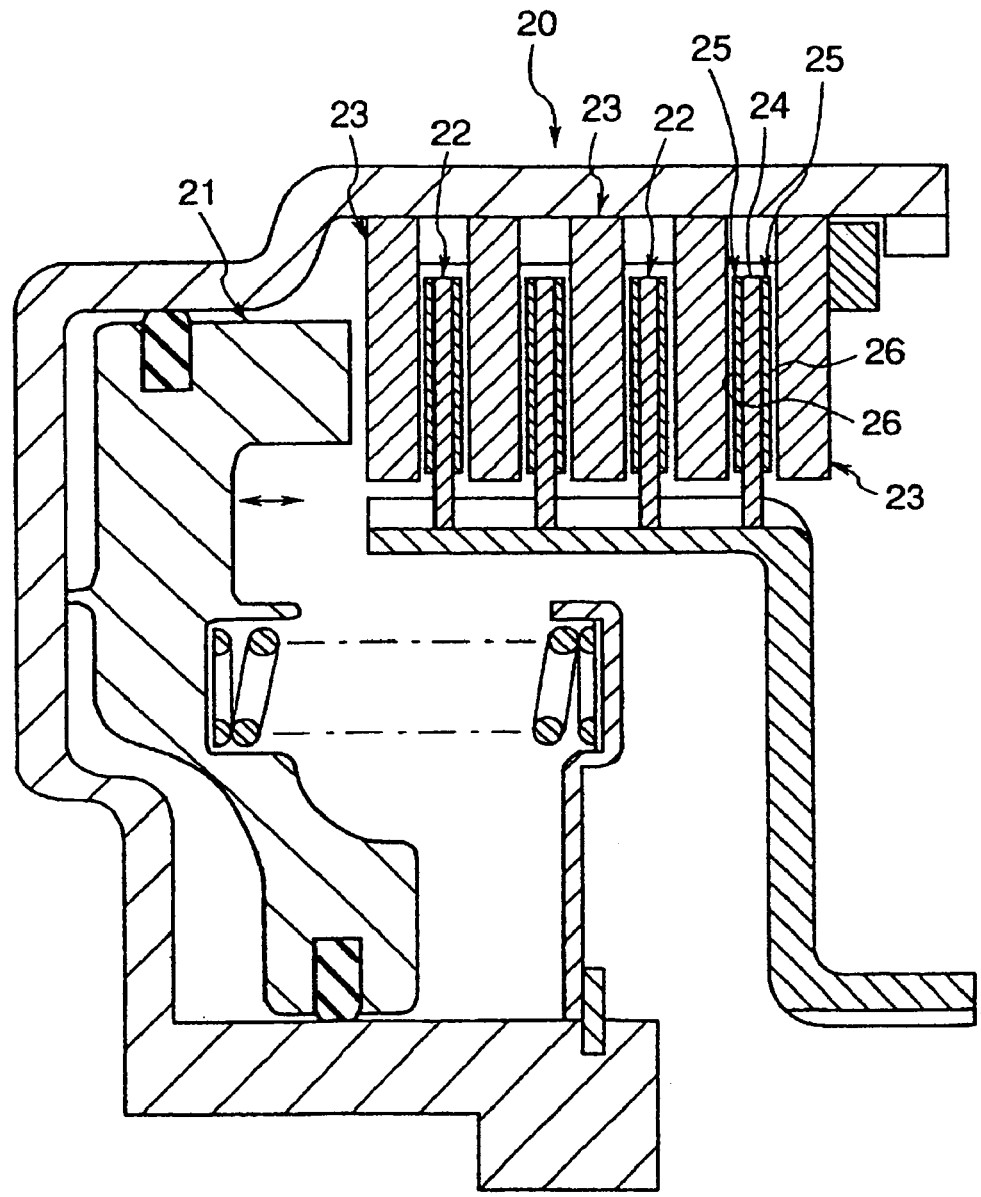
FIG. 10 is a cross-sectional view of a multiple-disk friction engagement apparatus.

The result is shown in FIG. 9. It can be seen in FIG. 9 that the groove structure obtained by the optimizing method according to the present invention has a remarkable effect in reducing drag torque in comparison with a conventional groove structure.

In addition, the optimum values of the entrance angle (opening angle) θ and the ratio h/w of the full length w of the groove to the length of the inner section were selected from the results of the calculations of the outgoing flow per groove area of the friction disks with the outer diameters of 200 mm and 100 mm shown in FIGS. 6 and 7, and drag torque was examined following the same procedures as the above example. As a result, equally excellent effects as that of the example was obtained for the friction disks with outer dimensions of 200 mm and 100 mm.

As discussed above, according to the present invention, it is possible to optimize the groove structure of a friction disk of a wet-type friction engaging element, specifically the groove structure comprising sectoral inner section widening inwardly formed on the surface of the friction disk of the wet-type friction engaging element, by calculating the outgoing flow per groove area based on the entrance angle (opening angle) θ and the ratio h/w of the full length w of the groove to the length h of the inner section; and then determining a ranges of said entrance angle (opening angle) θ of the inner section and said ratio h/w of the full length w of the groove to the length h of the inner section where said outgoing flow per groove area is at least a certain value; and therefore, it has an anadvantage that a groove structure of a friction disk, which can increase the outgoing flow of lubricating oil on the friction surface without losing heat-resistance property, increase the content of air in lubricating oil, and reduce drag torque, can be easily obtained.

What is claimed is:

1. A method for making a wet-type friction engaging element comprising an annular friction disk having an inner edge having an inner diameter, an outer edge having an outer diameter, and radial grooves extending from the inner edge to the outer edge and open to both edges, wherein each of said radial grooves has an inner section extending from the inner edge of the disk to an intermediate location between the inner edge and the outer edge, and an outer section extending from said intermediate location to the outer edge, wherein the inner section is defined by two opposed sides disposed at an angle θ relative to each other such that the groove is tapered and the circumferential width the groove at said inner edge is greater than the circumferential width of the groove at said intermediate location, and wherein w is the full radial length of each groove measured radially from the inner edge of the disk to the outer edge, and h is the radial length of the inner section measured radially from the inner edge of the disk to said intermediate location, the method comprising the steps of:

selecting a desired value for the minimum outgoing flow per groove area;

calculating, for a friction disk having said inner and outer diameters, a two-dimensional region, where one dimension is h/w and the other dimension is θ, within which the outgoing flow per groove area is at least as great as the selected desired value; and forming the radial grooves in said friction disk so that the values of h/w and θ fall within said two-dimensional region;

whereby said disk has an optimized groove structure.

2. A wet-type friction engaging element comprising:

an annular friction disk having an inner edge with an inner diameter, an outer edge having an outer diameter, and radial grooves extending from the inner edge to the outer edge and open to both edges;

wherein each of said radial grooves has an inner section extending from the inner edge of the disk to an intermediate location between the inner edge and the outer edge, and an outer section extending from said intermediate location to the outer edge;

wherein the inner section is defined by two opposed, substantially straight, sides disposed at an angle θ relative to each other such that the groove is tapered and the circumferential width the groove at said inner edge is greater than the circumferential width of the groove at said intermediate location;

wherein the outer section is defined by two opposed, substantially straight, sides which are disposed relative to each other at an angle in the range from 0 degrees to a angle exceeding 0 degrees by which they diverge from each other proceeding radially outward, whereby the circumferential width of each groove at the outer edge is at least as great as the circumferential width of the groove at said intermediate location;

wherein w is the full radial length of each groove measured radially from the inner edge of the disk to the outer edge, and h is the radial length of the inner section measured radially from the inner edge of the disk to said intermediate location;

wherein, the angle θ is in the range from 15 to 60 degrees; and wherein the ratio h/w is in the range from 0.4 to 1.

* * * * *